(12) United States Patent
Kerber

(10) Patent No.: US 8,021,110 B2
(45) Date of Patent: Sep. 20, 2011

(54) TONAL EMISSION CONTROL FOR WIND TURBINES

(75) Inventor: Lutz Kerber, Rheine (DE)

(73) Assignee: General Electric Company, Schenectady, NY (US)

( * ) Notice: Subject to any disclaimer, the term of this patent is extended or adjusted under 35 U.S.C. 154(b) by 1205 days.

(21) Appl. No.: 11/620,065

(22) Filed: Jan. 5, 2007

(65) Prior Publication Data

US 2008/0164091 A1    Jul. 10, 2008

(51) Int. Cl.
- F01D 7/00    (2006.01)
- B63H 3/06    (2006.01)
- F04D 29/66   (2006.01)

(52) U.S. Cl. .................. 416/1; 416/35; 416/61

(58) Field of Classification Search .......... 181/211; 290/44, 55; 416/35–37, 61, 1
See application file for complete search history.

(56) References Cited

U.S. PATENT DOCUMENTS

| | | | | |
|---|---|---|---|---|
| 4,339,666 A * | 7/1982 | Patrick et al. | .................. | 290/44 |
| 5,523,701 A * | 6/1996 | Smith et al. | .................. | 324/772 |
| 5,793,625 A * | 8/1998 | Balogh | .................. | 363/89 |
| 6,499,002 B1 * | 12/2002 | Lancaster | .................. | 702/191 |
| 6,688,841 B1 * | 2/2004 | Wobben | .................. | 415/1 |
| 6,703,718 B2 * | 3/2004 | Calley et al. | .................. | 290/44 |
| 6,785,637 B1 * | 8/2004 | Wobben | .................. | 702/188 |
| 6,940,185 B2 * | 9/2005 | Andersen et al. | .................. | 290/44 |
| 6,966,754 B2 * | 11/2005 | Wobben | .................. | 416/61 |
| 7,086,834 B2 * | 8/2006 | LeMieux | .................. | 416/1 |

FOREIGN PATENT DOCUMENTS

| | | |
|---|---|---|
| DE | 19926553 A1 | 12/2000 |
| EP | 1192355 B1 | 11/2004 |
| EP | 1269015 B1 | 8/2005 |
| EP | 1389682 B1 | 10/2005 |
| WO | WO02053910 A1 | 7/2002 |

OTHER PUBLICATIONS

European Patent Office published EP Search Report issued in connection with corresponding EP Application No. 08101499 on Jun. 12, 2008.

* cited by examiner

*Primary Examiner* — Justine Yu
*Assistant Examiner* — Sean J Younger
(74) *Attorney, Agent, or Firm* — Global Patent Operation; Douglas D. Zhang

(57) ABSTRACT

A system for the noise reduction of wind turbines comprises at least one acoustic sensor provided at the wind turbine, a detection unit and a control unit, wherein said detection unit is adapted to detect tonal components in a signal of said sensor, and wherein said control unit is adapted to control wind turbine operating parameters in dependence of an amplitude of a tonal component.

20 Claims, 3 Drawing Sheets

TONAL EMISSION CONTROL FOR WIND TURBINES

BACKGROUND OF THE INVENTION

The present invention relates to a system for the control of tonal noise emissions in wind turbines. The present invention further relates to a wind energy system including the same.

Wind energy systems have gained more and more importance as a source of energy in recent years. As areas suitable for their economical operation are relatively scarce in a number of countries, a growing number of wind energy systems are located close to populated areas. As the running of wind turbines in wind energy systems causes noise, this leads to various problems, such as resistance from neighborhoods and the like. A variety of factors contribute to the overall noise emission of such systems, of which one is the tonal emission caused by moving mechanical parts. These parts may for example be the generator or other parts of the drive train which tend to resonate at resonant frequencies. A well-known source for tonal emissions are gearboxes, which is mainly due to the occurrence of teeth-meshing frequencies. The tonal emission behaviour of mechanical parts in the drive train depends on a variety of factors, of which some are hardly influenceable by a manufacturer. Often, the only possibility to improve tonal emission characteristics of a wind turbine is to exchange the noise generating parts, e.g. a gearbox or a generator. However, this causes high costs for the owner due to downtime, exchange costs and costs for the new equipment. Thus, what is needed are cost efficient measures to reduce the tonal emissions caused by a wind energy system.

Methods for reducing the noise emissions of wind energy systems have long been discussed. For example, it was proposed to reduce aerodynamic noise caused by the blades through a speed/torque control of the system in order to keep turbine speed low during certain time intervals, e.g. during night time. Others have proposed to reduce speed/torque of the wind turbines in a wind park individually in order to gain maximum overall performance of the system while avoiding that a part of the wind turbines runs at significantly higher speeds than the average speed of all turbines. Another example for the application of a speed/torque control, however not related to noise reduction, is the proposal to quickly steer a wind turbine through ranges of rotor speed which typically cause low frequency resonances of the wind turbine tower to avoid structural damage.

BRIEF DESCRIPTION OF THE INVENTION

In view of the above, a system for the reduction of tonal noise emission of wind turbines is provided.

In a first aspect of the present invention, a system for the noise reduction of wind turbines is provided, which includes at least one acoustic sensor providing a signal adapted for attachment to a wind turbine, a detection unit, and a control unit. The detection unit is adapted to receive a sensor signal from the sensor and to detect a tonal component in the sensor signal. The control unit is adapted to receive an input from the detection unit and to control at least one wind turbine control parameter in dependence of an amplitude of the tonal component in order to lower the amplitude.

Hereinafter, the expression "tonal emission" or "tonal component" is used for acoustic emissions which can be typically characterised by the fact that they consist substantially of one or a few fundamental frequencies. Moreover, opposed to statistical noise, tonal components exhibit a substantially periodic behaviour. They can be characterised by their main frequency. Tonal emissions or components are mainly caused by periodic oscillations or interactions in mechanical systems.

The present invention allows for the effective avoidance of tonal emissions caused by a wind turbine. It is particularly useful to lower tonal emissions caused by tooth-meshing-effects of gearboxes. Therefore, it is possible to minimize tonal emissions caused by a drive train, or particularly a gearbox, without the need for time consuming and/or costly manipulations of the system such as an exchange of a gearbox, a generator or the like.

In a further aspect of the present invention, a wind turbine including a system for the reduction of tonal noise emissions is provided, which includes at least one acoustic sensor providing a signal and adapted for attachment to said wind turbine, a detection unit, and a control unit. The detection unit is adapted to receive a sensor signal from said sensor and to detect a tonal component in the sensor signal, and the control unit is adapted to receive an input from the detection unit and to control at least one wind turbine operating parameter in dependence of an amplitude of the tonal component in order to lower the amplitude.

In a third aspect of the present invention, there is provided a method to reduce tonal noise emissions of wind turbines, which includes the steps of monitoring an acoustic emission of a wind turbine, of detecting a tonal component in said acoustic emission, and, if an amplitude of a tonal component exceeds a predefined level, of controlling at least one operating parameter of said wind turbine in order to reduce the amplitude of the tonal component.

Further aspects, advantages and features of the present invention are apparent from the dependent claims, the description and the accompanying drawings.

It is possible to use the system of the present invention in any wind energy system.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
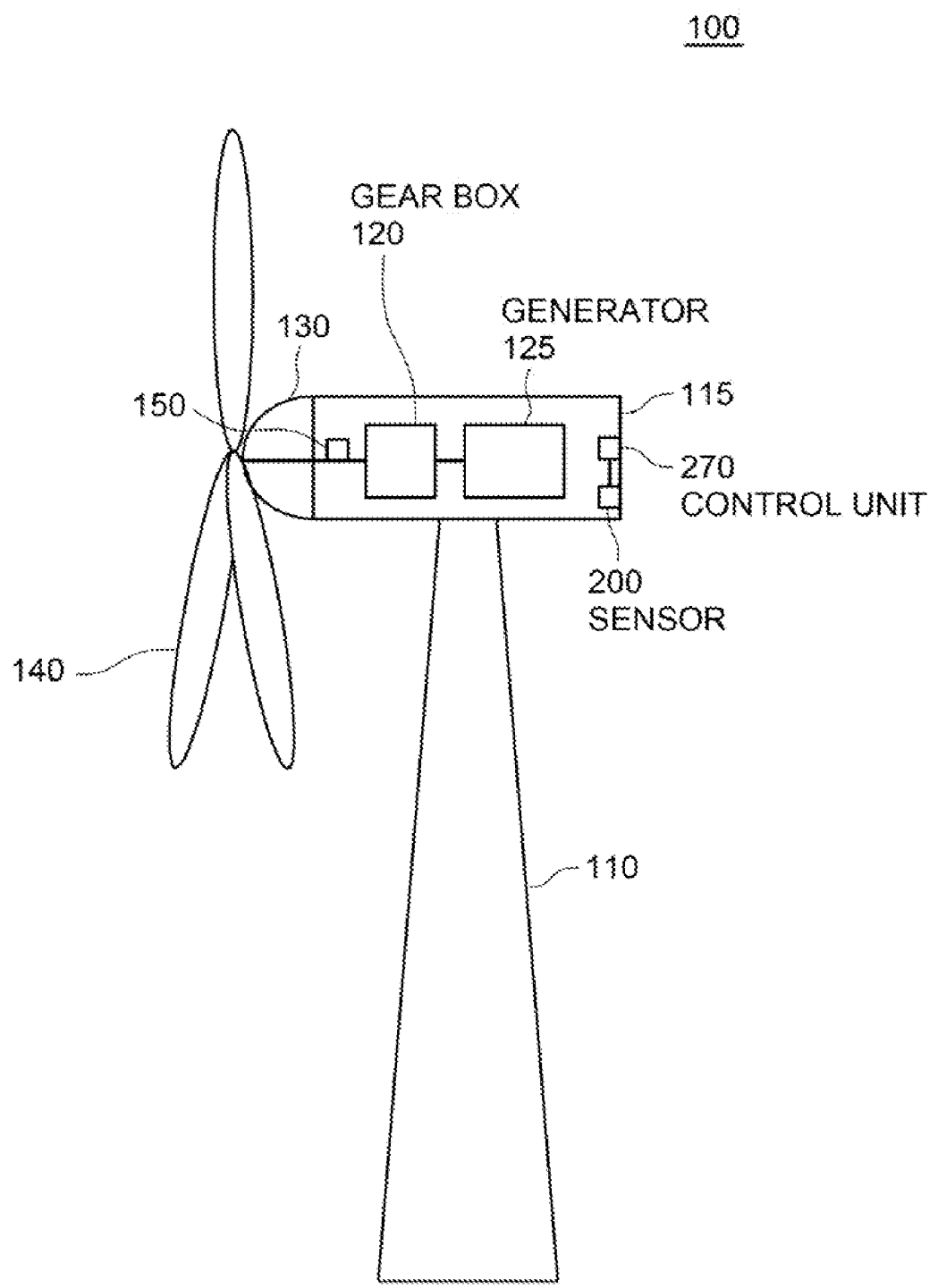
FIG. 1 is a schematic view of a type of a wind turbine.

FIG. 1 is a schematic view of a typical wind turbine. The wind turbine 100 includes a tower 110 to which a machine nacelle 115 is mounted at its top end. The nacelle houses a drive train to which a gearbox 120 is connected. The output of the gearbox is connected to a main electric generator 125. A hub 130 bearing three rotor blades 140 is mounted to a lateral end of the machine nacelle 115. The rotor blades 140 can be adjusted by a pitch drive 150 which is typically accommodated inside hub 130. The wind turbine 100 further includes a sensor 200.

Figure 2:
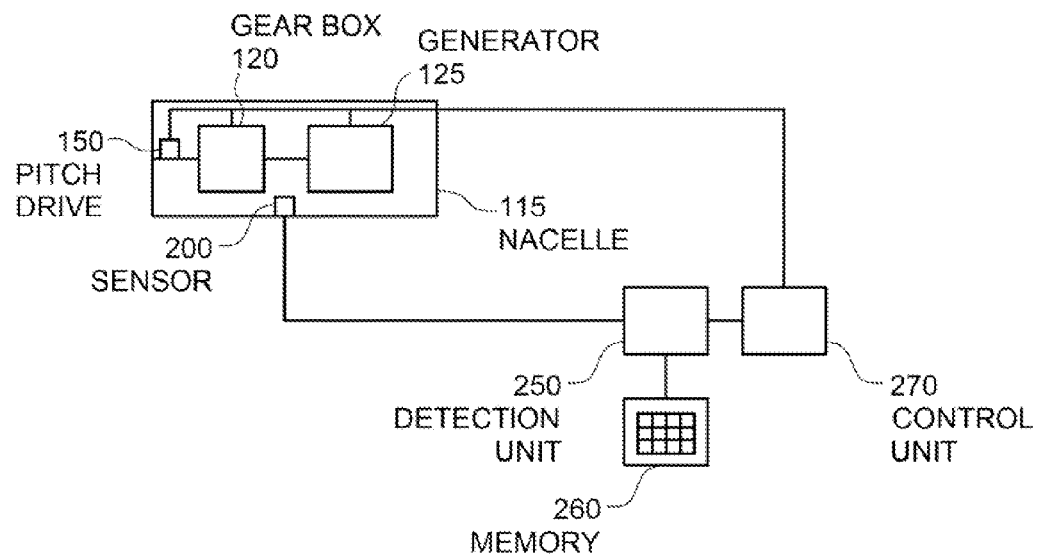
FIG. 2 is a schematic view of a system for the lowering of tonal emissions of a wind turbine according to an embodiment of the invention.

FIG. 2 shows a schematic view of an embodiment of the present invention. A sensor 200 to detect acoustic vibrations or sound is provided in the wind turbine tower or in the vicinity of or directly at a gearbox 120 or a generator 125 housed in a machine nacelle 115 of a wind turbine. The sensor may be a vibroacoustic sensor for measuring the vibration velocity, a microphone, or any type of sensor known from the art which is suitable for the detection of vibrations and/or sound. The sensor may be disposed having a mechanical connection to the gearbox 120, at a location in its vicinity or at any suitable location in the nacelle or the wind turbine tower 110. A detection unit 250 is connected to receive an output signal of the sensor. The detection unit continuously or intermittently analyzes the sensor signal with respect to its frequency spectrum via a detection algorithm, such as fast Fourier transform (FFT) or discrete Fourier transform (DFT). Suitable algorithms and techniques for this purpose are well known to those skilled in the art. The detection unit is typically adapted to compare signal levels at certain frequencies or at frequency ranges with predefined thresholds or limit values for the respective frequencies or ranges. The threshold values are stored in a reference data memory unit 260. It includes data for threshold values of the sensor signal for a plurality of reference frequencies. Typically, a frequency interval from 40 to 1800 Hertz is divided into channels of a width of 2 Hertz each. For each channel, for example from 420 to 422 Hertz, the memory unit comprises a threshold value. Typically, the width of the frequency channels for which amplitude limits are stored in the memory unit correspond to the frequency ranges which are monitored by the detection unit 250.

The detection unit 250 is coupled to a control unit 270. The control unit may be a part of the wind turbine control system or coupled thereto. It is adapted to receive signals from the detection unit 250. When the detection unit indicates the exceedance of a threshold value for one or more frequencies or frequency ranges, the control unit reacts by altering at least one control parameter of the wind turbine, typically the generator torque. Suitable parameters also include speed of the rotor and pitch angle of the rotor blades. The threshold value for the respective frequency or frequency range is stored in the reference data memory unit 260. At least one operating parameter of the wind turbine is controlled/changed by the control unit 270 until the amplitude of the tonal component has decreased sufficiently. The allowed threshold values stored in the reference data memory unit are typically determined according to the desired emission behavior of the individual wind turbine and the individual setup of the system, for example of the location and type of the sensors. Thus, threshold values may vary significantly depending on the environment in which the invention is applied. Accordingly, all numbers provided in the following have to be regarded as examples only, which do not limit the scope of the invention.

The inventors have carried out tests with wind turbines measuring tonal emissions of gearboxes. In the testing environment, typical amplitudes of tonal emissions in a range from 50 Hz to 1800 Hz were found to be in a range from 0, 1 mm/s to 2.0 mm/s (66 to 92 dB) when measured with a vibroacoustic sensor located at a gearbox. Similar ranges (0.04 to 0.8 mPa (66 to 92 dB)) may apply to measurements with a microphone in the nacelle.

A scenario showing the use of the system according to one embodiment of the present invention is as follows. During a rise of wind speed, the wind turbine increases rotor speed at constant torque and increases torque when deviations from a predetermined speed/torque curve become too large. During the increase of rotor speed, the detection unit 250 detects a rise of the amplitude at 131 Hz in the microphone signal, e.g. in the channel covering the range from 130 Hz to 132 Hz. The amplitude has a value of 250 mPa as measured by the microphone in the tower 110. In the detection unit, this value is compared with the threshold value for this frequency stored in the reference data memory unit, which is found to be 200 mPa. Accordingly, the algorithm in the detection unit decides that the tonal emission has exceeded the allowed limit and signals this fact to the control unit 270. The control unit decides on the strategy to lower the amplitude depending on the current operating parameters. In this case, the control unit decides to keep generator torque below the optimum torque/speed curve in order to accelerate the rise of rotor speed further, with the aim to steer the turbine out of the speed range in which the emission peak occurs as fast as possible. During increase of rotor speed, the emission frequency of the tonal component rises at the same rate as the speed, because it is caused by mechanical effects related to drive train speed. Hence, as the rotor speed increases, the control unit detects an amplitude in a neighboring channel with the higher frequency 135 Hz and an amplitude of 150 mPa. At 135 Hz, the stored threshold value in the memory unit is 210 mPa. As the amplitude of 150 mPa is calculated by the detection unit to be 28% lower than the respective threshold value, the detection unit signalizes to the control unit that there is no longer an exceedance of a threshold. Accordingly, the control unit then increases torque at now constant speed in order to return to the optimum torque/speed ratio.

In another embodiment, the rotor speed is changed by control of the generator torque until a detected amplitude of a tonal component has fallen to a certain percentage of the threshold value for the respective frequency. This percentage is typically defined to be in the range between 5% and 99%, more typically between 30 and 90%, e.g. 50%.

In another embodiment, the speed of the rotor is changed by a predefined percentage when a tonal emission is detected. The speed change is typically, but not necessarily achieved by control of the generator torque. Most tonal emissions are caused by effects related to the moving parts of the drive train and occur at certain frequencies only. As by altering rotor speed also the speed of the gearbox, the generator and other moving parts of the drive train are changed, their emission behavior can be influenced. As an example, a change of rotor speed in a range from 1 to 6% can be sufficient to lower the amplitude of a resonance induced tonal emissions by more than 50%. More typically, the range is from 2 to 4%, e.g. 3%.

In a scenario, a tonal emission occurs at a frequency of 262 Hz at a rotor speed of 13.3 rpm. The vibroacoustic sensor 200 located in the nacelle 115 delivers a signal to the detection unit 250 which is equivalent to a vibration velocity of 0.25 mm/s or 74 dB. The detection unit detects the emission peak at 262 Hz and compares the amplitude of 0.25 mm/s with the threshold value stored in the reference data memory unit 260 for this frequency, which is 0.1 mm/s. Accordingly, the detection unit decides that the signal exceeds the allowed value and delivers a respective signal to the control unit 270. The control unit then lowers or raises the rotor speed by the predefined percentage of 3%. Whether the speed is lowered or raised depends on a variety of factors including present wind conditions, operating parameters of the wind turbine and the like.

It is obvious to the skilled person that the details of control of a wind turbine in order to lower tonal emissions depend on a variety of factors. Accordingly, the various control methods described above may be modified or combined depending on the actual use case and are still regarded to fall into the scope of the present invention.

Figure 3:
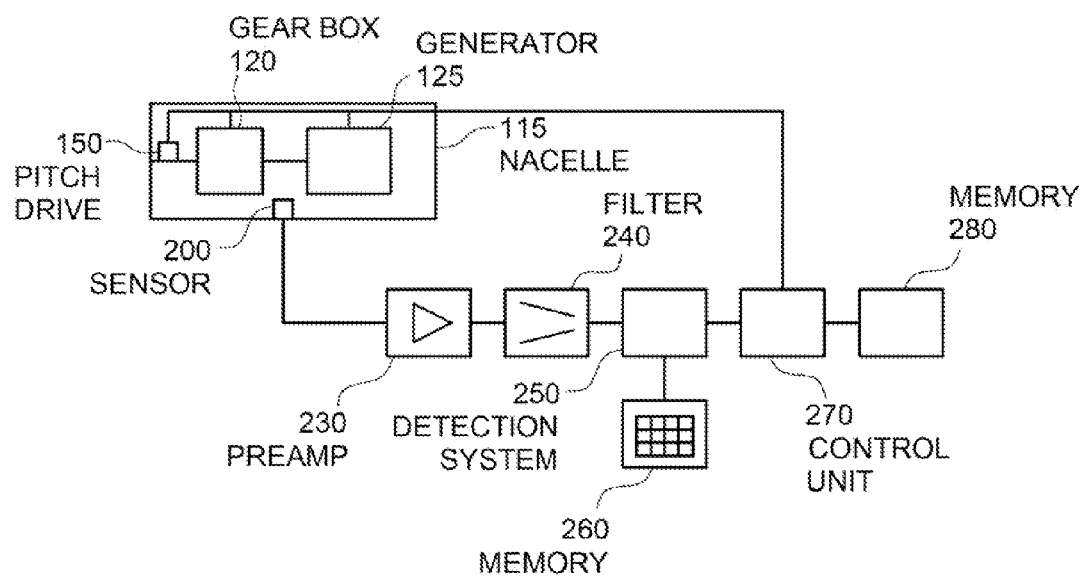
FIG. 3 is a schematic view of a system for the lowering of tonal emissions of a wind turbine according to another embodiment of the invention.

FIG. 3 shows another embodiment of the present invention, according to which the sensor 200 is coupled to a preamplifying unit 230. The preamplifying unit is typically accompanied by a filter unit 240. The sensor may also be integrated with the preamplifying unit and/or the filter unit. The filter unit serves to reduce the bandwidth of the signal received from the preamplifying unit to a frequency range of interest, which is typically between 30 and 2000 Hertz. The system further comprises a second memory unit 280 adapted to store data related to wind turbine operating parameters and data related to previously detected tonal components. The second memory unit may serve as a source for previous data on tonal emissions at various rotational speeds of the wind turbine. Typical stored data are frequency and amplitude of the tonal emission as well as rotor speed and torque at time of occurrence. In case of a failure of the sensor 200 or the detection system 250, the second memory unit 280 provides reference data to the control unit 270 as a fallback system. In this case, the control unit receives information from the second memory unit. If the received data indicates that tonal emissions which exceeded limit values occurred during operation at an earlier time with the present operating parameters like rotor speed and/or generator torque, the control unit may alter at least one of the operating parameters according to one of the control methods described above.

Figure 4:
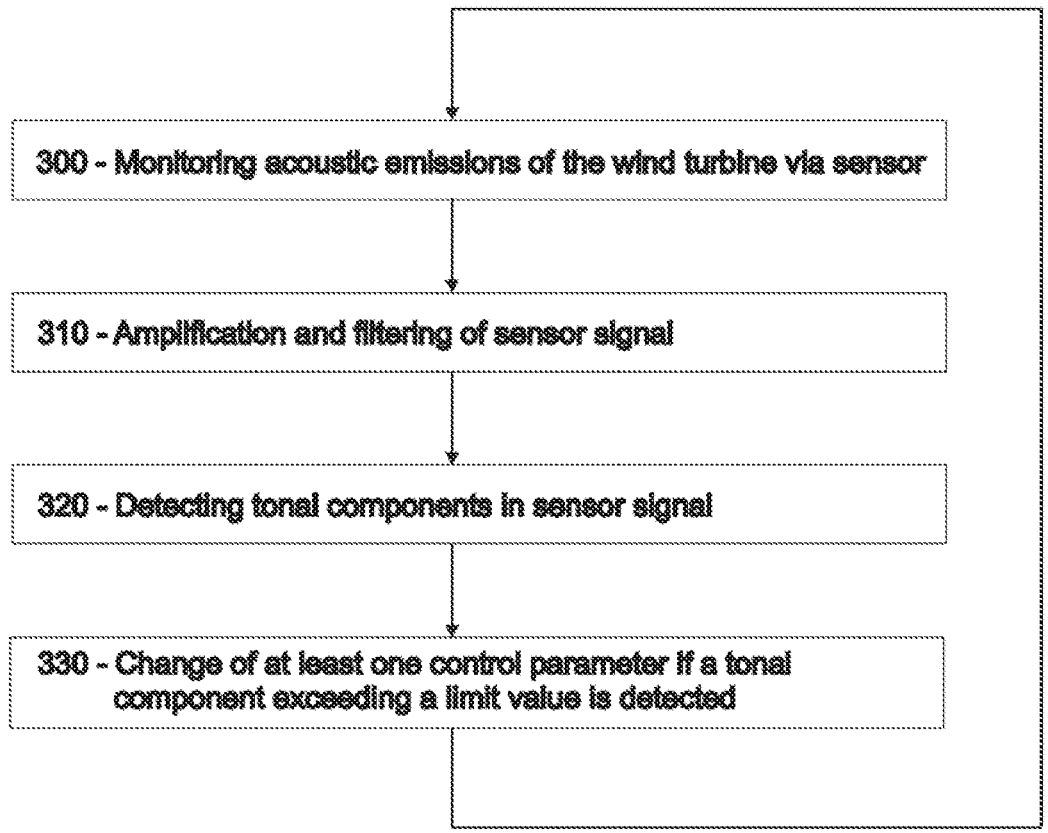
FIG. 4 is a diagram of a method for the lowering of tonal emissions of a wind turbine according to an embodiment of the invention.

FIG. 4 shows a diagram of the method used for the reduction of tonal emissions according to an embodiment of the present invention. In a first step 300, the acoustic emissions of the wind turbine are monitored by a sensor. In a second step 310, the sensor signal is amplified and optionally filtered. Then, the signal is transferred to a detection unit, wherein a detection algorithm detects emission peaks and their frequencies in a step 320. Typically, the algorithm is implemented as a hardware or software means. The algorithm is adapted to decide whether an amplitude of a tonal component exceeds a predefined level. If an exceedance is detected or measured, this information is transferred to a control unit, which initiates a change of at least one control parameter to reduce the amplitude of the tonal emission in a step 330. This typically includes control of one or a plurality out of the operating parameters generator torque, rotor speed and pitch of the rotor blades. It is obvious for a person skilled in the art that the above described method may be carried out and modified in a variety of ways which still fall in the scope of the present invention. Furthermore, it is obvious that the method steps may be carried out after suitably chosen time intervals, typically from 5 to 2000 milliseconds, more typically from 50 to 1000 milliseconds, e.g. 200 milliseconds or be repeated on a continuous basis. A typical method for carrying out the measurements is known to a skilled person as the ⅔-overlap. As an example, in this case a spectrum based on a time sample of e.g. 500 ms is calculated every 166.6 ms.

In another embodiment of the invention, the rate of change of rotational speed is increased via a change of a control parameter when an increase of a tonal component is detected during a change of rotational speed of the rotor. Alternatively, when an increase of a tonal component is detected during a change of rotational speed of the rotor, the rate of change of rotational speed is reduced. Both alternatives are typically implemented in an algorithm used for the control of the operating parameters and implemented in the control unit. Typically, the rate of change of rotational speed is enhanced if the amplitude of a tonal emission is recognized to exceed a threshold value. The aim is to steer the wind turbine out of the frequency range in which the emission occurs. Yet, if wind conditions are too strong, it may be more appropriate to slow down the rotor in order not to cause an overload of the wind turbine.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A system for the noise reduction of wind turbines, comprising:
   an acoustic sensor attached to a wind turbine for providing a sensor signal,
   a detection unit, and
   a control unit,
   wherein said detection unit is configured to receive the sensor signal from said sensor and to detect a tonal component in said sensor signal,
   wherein the detection unit is further configured to compare an amplitude of the tonal component of the sensor signal at a frequency in a predetermined frequency channel to a threshold value for the frequency and generate a control input if the amplitude exceeds the threshold value, and
   wherein said control unit is configured to receive the control input from said detection unit, determine a current operating condition of the wind turbine,
   increase a rotational speed of a rotor of the wind turbine until an amplitude of the tonal component of the sensor signal at a hider frequency in a neighboring frequency channel is detected, compare the amplitude of the tonal component of the sensor signal at the higher frequency in the neighboring frequency channel to a predetermined threshold value for the higher frequency, and increase a generator torque of the wind turbine at the increased rotational speed of the rotor if the amplitude is less than the predetermined threshold value for the higher frequency.

2. The system of claim 1, wherein said sensor is provided in a tower of said wind turbine, in a nacelle of the wind turbine or at a gearbox of the wind turbine.

3. The system of claim 1, wherein said sensor is chosen from the group consisting of a microphone, and a vibration sensor.

4. The system of claim 1, wherein said detection unit is configured to detect a tonal component in a frequency range between 30 Hertz and 2000 Hertz, both included.

5. The system of claim 1, further comprising a reference data memory unit for storing the threshold value.

6. The system of claim 1, further comprising a memory unit configured to store data related to the generator torque of the wind turbine, the rotational speed of the rotor of the wind turbine or a pitch angle of the rotor blades of the wind turbine and data related to a previously detected tonal component.

7. The system of claim 1, wherein said sensor is integrated with said detection unit.

8. A wind turbine comprising the system of claim 1.

9. A method to reduce tonal noise emissions of wind turbines, comprising:
  using a sensor to monitor an acoustic emission of a wind turbine at a part of a structure of the wind turbine,
  detecting a tonal component in said acoustic emission at a frequency in a predetermined frequency channel,
  if an amplitude of said tonal component exceeds a predefined level in the predetermined frequency channel, determining a current operating condition of the wind turbine and adjusting a generator torque of the wind turbine, a rotor rotational speed of the wind turbine or a pitch angle of rotor blades of the wind turbine in dependence of the current operating condition to reduce said amplitude of said tonal component; and
  detecting a failure of the sensor, comparing a current rotor rotational speed and generator torque value of the wind turbine to a set of previously determined tonal component values for prior rotor rotational speed and generator torque value combinations, and if an amplitude of a tonal component corresponding to the rotor rotational speed and generator torque value combination exceeds a threshold value, adjusting the rotor rotational speed and generator torque to a new rotor rotational speed and generator torque value combination where the corresponding tonal component does not exceed the threshold value.

10. The method of claim 9, wherein the current operating condition is a wind speed of a wind flow impacting on the wind turbine.

11. The method of claim 9, wherein the generator torque of the wind turbine, the rotor rotational speed of the wind turbine or the pitch angle of the rotor blades of the wind turbine is adjusted until the amplitude of said tonal component is reduced to a level lower than 50% of the predefined level.

12. The method of claim 9, wherein, when an increase of an amplitude of a tonal component is detected during a change of the rotor rotational speed, a rate of change of the rotor rotational speed is increased via the adjusting.

13. The method of claim 9, wherein, when an increase of an amplitude of a tonal component is detected during a change of the rotor rotational speed, the rate of change of the rotor rotational speed is reduced via the adjusting.

14. The method of claim 9, wherein the adjusting comprises changing the rotor rotational speed of said wind turbine by a predefined percentage.

15. The system of claim 1, wherein the sensor detects an acoustic emission of a mechanical part of the wind turbine.

16. The system of claim 1, wherein determining the current operating condition of the wind turbine comprises determining a wind speed of a wind flow impacting on the wind turbine, and if the wind speed is increasing, maintaining the generator torque below an optimum generator torque-rotor speed value to accelerate a rise in the rotational speed of the rotor until the amplitude of the tonal component at the frequency is below the threshold value.

17. A system for the noise reduction of wind turbines, comprising:
  an acoustic sensor attached to a wind turbine for providing a sensor signal,
  a detection unit configured to receive the sensor signal from said sensor, detect a tonal component in said sensor signal, compare an amplitude of the tonal component of the sensor signal at a frequency in a predetermined frequency channel to a threshold value for the frequency, and generate a control input if the amplitude exceeds the threshold value,
  a control unit configured to receive the control input from said detection unit, determine a current operating condition of the wind turbine, and adjust a generator torque of the wind turbine, a rotational speed of a rotor of the wind turbine or a pitch angle of rotor blades of the wind turbine in dependence of the current operating condition to lower said amplitude; and
  a memory unit for storing data related to wind turbine operating parameters and previously detected tonal components, wherein upon a failure of the sensor, the control unit is configured to receive a set of previously detected tonal component values for prior rotational speed of the rotor and generator torque value combinations from the memory unit, compare a current rotational speed of the rotor and generator torque value of the wind turbine to the set of previously detected tonal component values for prior rotational speed of the rotor and generator torque value combinations, and if an amplitude of a tonal component corresponding to the rotational speed of the rotor and generator torque value combination exceeds the threshold value, adjusting the rotational speed of the rotor and generator torque to a new rotational speed of the rotor and generator torque value combination where the corresponding tonal component does not exceed the threshold value.

18. The method of claim 10, further comprising determining if the wind speed is increasing, and maintaining the generator torque below an optimum generator torque-rotor speed value to accelerate a rise in the rotor rotational speed of the wind turbine until the amplitude of the tonal component at the frequency is below the predefined level.

19. The system of claim 17, wherein said sensor is provided in a tower of said wind turbine, in a nacelle of the wind turbine or at a gearbox of the wind turbine.

20. The system of claim 17, wherein said detection unit is configured to detect a tonal component in a frequency range between 30 Hertz and 2000 Hertz, both included.

* * * * *